Dec. 22, 1931.  T. C. LENNOX  1,837,973
ELECTRIC APPARATUS
Filed Oct. 27, 1928  2 Sheets-Sheet 1
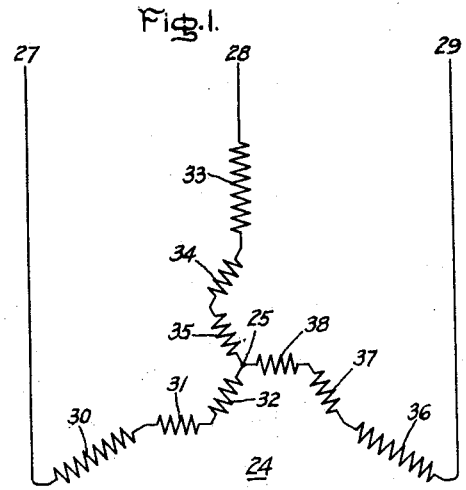
Fig.1.
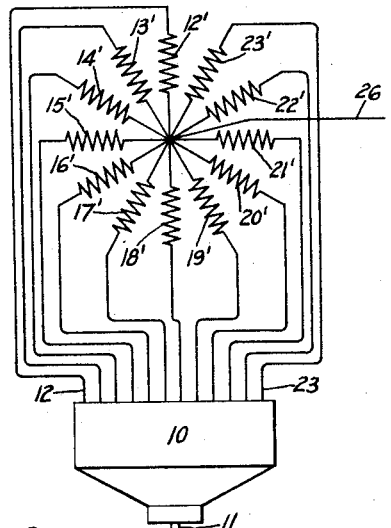
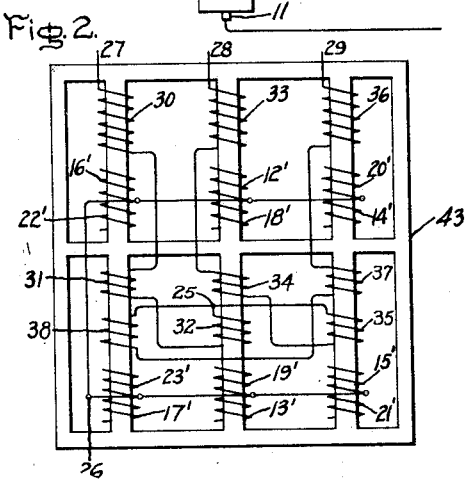
Fig.2.
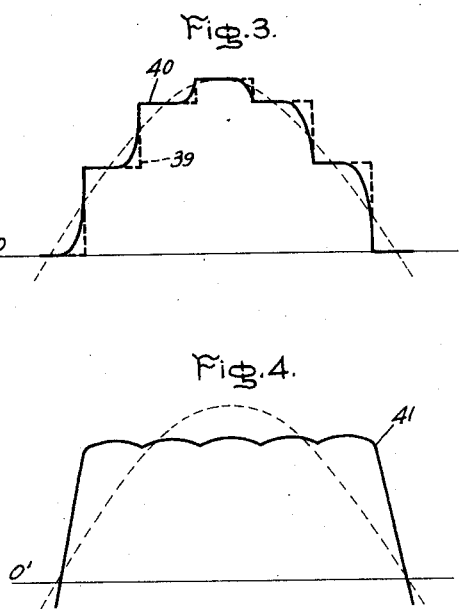
Fig.3.
Fig.4.
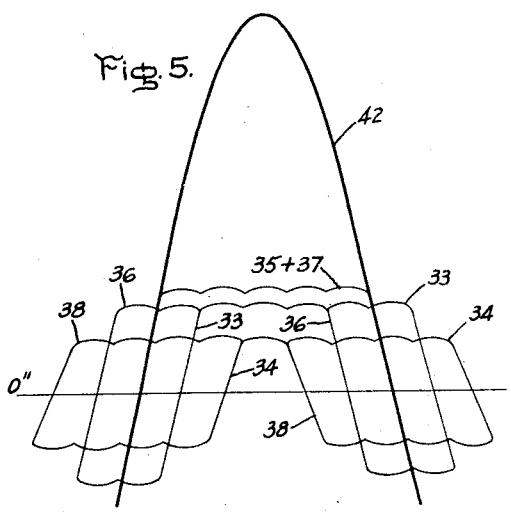
Fig.5.
Inventor:
Thomas C. Lennox,
by Charles E. Tulla
His Attorney.

Dec. 22, 1931.   T. C. LENNOX   1,837,973
ELECTRIC APPARATUS
Filed Oct. 27, 1928    2 Sheets-Sheet 2

Inventor:
Thomas C. Lennox,
by Charles E. Mullan
His Attorney.

Patented Dec. 22, 1931

1,837,973

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

ELECTRIC APPARATUS

Application filed October 27, 1928. Serial No. 315,566.

My invention relates to electric apparatus for transmitting power between alternating and direct current terminals, such as a transformer and a mercury arc rectifier connected thereto, and has for its principal object the provision of an improved rectifying system which does not require the usual interphase transformer and operates with a comparatively high degree of efficiency.

In the operation of mercury arc rectifiers it is sometimes desirable to supply current of 12 or more phases to the anodes thereof. Since most sources are of only 3 phases, the multiplication of the phases must take place in the transformer.

The transformer secondary winding must necessarily possess a neutral terminal since this forms the negative terminal of the direct current circuit. In a 12 phase secondary winding, it has heretofore been impractical to use a simple star connection because the small degree of overlap of the currents of the successive anodes and the high reactance between adjacent anodes cause a very inefficient use of the secondary winding, poor regulation of the direct current voltage, and low power factor. For this reason it has been customary to divide the secondary winding into Y-connected groups provided with neutral terminals which are interconnected through an interphase transformer to one terminal of the direct current circuit. This latter arrangement however, has the disadvantage that its cost is comparatively high due to the use of the interphase transformer and that unbalancing may be produced between the different phases.

In accordance with my invention, the use of an interphase transformer is avoided, balancing between the phases is produced, and over-lapping of the anode currents is effected by arranging the primary windings to produce the phase displacement required for proper excitation of the secondary winding, and by arranging the core of the transformer to permit the generation of harmonic voltages, such as will cause the desired over-lapping of the anode currents.

My invention will be better understood from the following description when considered in connection with the accompanying drawings and its scope will be pointed out in the appended claims.

Figure 6:
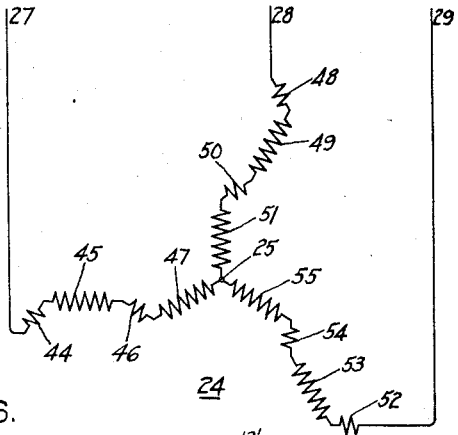
Figure 7:
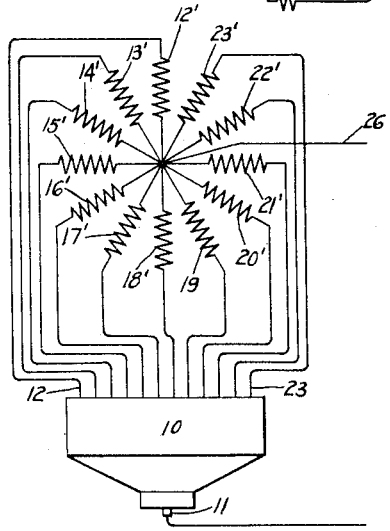
Figure 7:
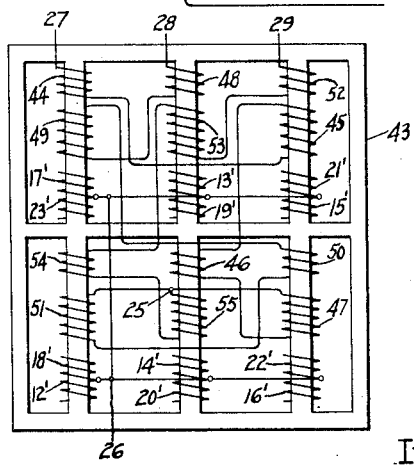

In the accompanying drawings Fig. 1 diagrammatically illustrates a rectifying system arranged in accordance with my invention; Fig. 2 illustrates a possible core construction for the transformer of Fig. 1 and the connection of the coils thereon; Figs 3, 4 and 5 are the current and potential curves resulting from the arrangement of windings illustrated in these figures and Figs. 6 and 7 illustrate a modification of my invention.

Referring to the drawings in detail, Fig. 1 illustrates a rectifier 10 having a cathode 11 connected to the positive terminal of a direct current circuit, and anodes 12 to 23 inclusive connected to the secondary winding of a transformer 24.

In accordance with my invention the primary coils of the transformer 24 are Y-connected and provided with a neutral terminal 25 and with end terminals 27, 28 and 29. This primary circuit includes coils 30 to 38 of which 30 to 32, 33 to 35 and 36 to 38 are connected in series respectively to form the three different phases. The transformer core is provided with six independent magnetic circuits upon each of which is wound a primary and secondary winding, and for convenience the primary circuit will be considered as two sets of 3-phase primary windings. Thus coils 30, 33 and 36 may be each considered as one primary winding in series with a second primary winding which is connected in zigzag formation and includes the coils 31 and 32, 34 and 35, and 37 and 38 respectively. Each phase of the combined primary circuit is made up of 3 coils wound on different legs of the core so as to obtain the six phase positions with a 30° displacement between them, thereby producing the twelve secondary phases suitable for use in connection with the rectifier 10.

The secondary winding is a simple diametric winding including coils 12' to 23' inclusive, each connected to a neutral terminal 26 which is connected to the negative side of the direct current circuit, and to the anodes 12 to 23 respectively. In the operation of this arrangement substantially uniform direct current should be supplied through the neutral terminal 26, and the currents flowing to the anodes 12 to 23 inclusive must total up to this current.

It will be noted that in this arrangement all of the necessary phase displacement is obtained in the primary winding which is usually the high voltage winding, and therefore better suited for the obtaining of necessary voltage ratios than the secondary winding. As above stated the secondary winding has one neutral terminal, and the anode currents are transmitted through this terminal. At the same time the primary currents must be such that they will equalize at the neutral point 25 and that the current in each of the zigzag phases is equal to and in phase with that of the Y phase with which it is connected in series. Thus in Fig. 1 the current in winding 30 must be the same as in 31 or 32.

The result of these two conditions is shown in Fig. 3 which indicates on axis 0, by dotted line 39, the form of anode current which may flow without violating the above stated conditions. The full line curve 40 in this figure indicates the current distorted by the effect of transformer leakage reactance. The existence of this wave form during the operation of the apparatus has been verified by oscillograms.

It is observed that this wave form indicates five anodes active simultaneously, the result of which is that the voltage of the five phases connected to those anodes must be equal and must be equal to the direct current voltage. This is indicated in Fig. 4 illustrating the voltage wave form 41 existing in each of the secondary phases (neglecting the effect of reactance). This wave form must consequently exist in each of the primary phases. At the same time the resultant voltage in the primary phases will be such that the sine wave voltage at terminals 27, 28 and 29 is not distorted. Fig. 5 illustrates how the distorted wave voltages in the windings between terminals 28 and 29 add up to the simple sine wave voltage 42 of the source.

From the above it is seen that the transformer acts to bring about a flow of anode currents which are distributed over 150° of the cycle, whereby efficient use is made of the secondary winding while at the same time giving the advantages of 12 phase operation, and that this result is obtained without the use of interphase transformers or other auxiliary reactances in the secondary circuit.

Another advantage of this arrangement is that the primary coils being placed in series, the currents in the secondary coils are equalized and consequently give more nearly perfect 12 phase operation than can usually be obtained for transformer arrangements which have a common primary and a plurality of groups of secondary windings.

A further advantage is that the current in the secondary windings approximates more closely a half sine wave than in the more usual arrangements so that an economy of material in the device is realized.

In Fig. 2 I have illustrated one possible construction of the core 43 for transformers as above described and the arrangement of the coils of Fig. 1 thereon. It is desirable for the carrying out of this invention that the transformer contain six independent phases; that is, six phases each of which has a complete magnetic circuit so that harmonic voltages can be freely generated in each phase. This may consist of six seperate single phase transformers, two 3 phase transformers, or one combination transformer, provided the above requirement is complied with.

The arrangement of windings in Fig. 6 is similar to that of the Fig. 1 but differs therefrom in that the necessary phase displacement in the primary windings is obtained by causing a 15° displacement in each of the two sets of primaries rather than a 30° displacement in one of the sets, as shown in Fig. 1. This connection may be desirable in some instances where it is easier to obtain balanced characteristics in the transformer than with the other arrangement. Referring to this figure in detail, the primary windings are divided into coils 44 to 55 inclusive of which 44 to 47, 48 to 51, and 52 to 55 are connected in series in three groups, which groups are then connected to a common point and to the 3 phase source. The ratio of the short to the long coils, such as the ratio of coils 44 to 45 for example, is that of sine 15° to sine 45° or such as to obtain a 15° displacement in each set of the primary windings.

In Fig. 7 is illustrated the arrangement and connection of the coils of Fig. 6 on core 43. This coil arrangement is similar to that of Fig. 2 and will be readily understood without further explanation.

What I claim as new and desire to secure by Letters Patent of the United States, is:

1. The combination of direct and alternating current terminals, a rectifier provided with a plurality of anodes and with a cathode connected to one of said direct current terminals, and a transformer including a secondary circuit connected to said anodes and a primary circuit connected to said alternating current terminals and so arranged as to cause current to be carried by each of said anodes during substantially one hundred and fifty electrical degrees of the cycle of the potential applied to said alternating current terminals.

2. The combination of direct and polyphase alternating current terminals, a rectifier provided with a plurality of anodes and with a cathode connected to one of said direct current terminals, and a transformer provided with a secondary circuit including end terminals each connected to a different one of said anodes and a neutral terminal connected to another of said direct current terminals and with a primary winding connected to said polyphase terminals and so arranged as to cause current to be carried by each of said anodes during substantially one hundred and fifty electrical degrees of the cycle of the potential applied to said polyphase terminals.

3. The combination of an electric discharge device including anodes and a cathode, and a transformer including a polyphase secondary winding connected to said anodes, a primary winding, and a core arranged to support said windings, said primary winding and said core being so arranged as to cause the generation of harmonic voltages whereby current is caused to flow through each anode during substantially 150° of a cycle of the potential applied to said primary winding.

4. The combination of an electric discharge device including a plurality of anodes and a cathode, and a transformer including a polyphase secondary winding connected to said anodes and provided with a neutral terminal, a primary winding including two 3 phase primary coils connected in series, one of said primary coils being connected in zigzag relation, and a core arranged to support said windings and to cause in cooperation with said primary winding the generation of harmonic voltages whereby each anode is caused to carry current during substantially 150° of a cycle of the potential applied to said primary winding.

5. The combination of an electric discharge device including a plurality of anodes and a cathode, and a transformer including a polyphase secondary winding connected to the anodes and provided with a neutral terminal, a primary winding including two 3 phase coils connected in series with one another in zigzag relation, and a core arranged to support said windings and to cause in cooperation with said primary winding the generation of harmonic voltages whereby the current of each of said anodes is caused to flow during substantially 150° of a cycle of the potential applied to said primary circuit.

In witness whereof, I have hereunto set my hand this 25th day of Oct. 1928.

THOMAS C. LENNOX.